US012458790B2

(12) United States Patent
Yu et al.

(10) Patent No.: US 12,458,790 B2
(45) Date of Patent: Nov. 4, 2025

(54) VENTRICULAR ASSIST DEVICE

(71) Applicant: Shenzhen Core Medical Technology CO. Ltd., Shenzhen (CN)

(72) Inventors: Shunzhou Yu, Shenzhen (CN); Jun Huang, Shenzhen (CN); Cihua Luo, Shenzhen (CN); Linglin Kong, Shenzhen (CN)

(73) Assignee: SHENZHEN CORE MEDICAL TECHNOLOGY CO. LTD., Shenzhen (CN)

( * ) Notice: Subject to any disclaimer, the term of this patent is extended or adjusted under 35 U.S.C. 154(b) by 1479 days.

(21) Appl. No.: 16/970,938

(22) PCT Filed: Nov. 6, 2019

(86) PCT No.: PCT/CN2019/115951
§ 371 (c)(1),
(2) Date: Aug. 18, 2020

(87) PCT Pub. No.: WO2020/119337
PCT Pub. Date: Jun. 18, 2020

(65) Prior Publication Data
US 2020/0405928 A1 Dec. 31, 2020

(30) Foreign Application Priority Data
Dec. 12, 2018 (CN) .......................... 201811519883.1

(51) Int. Cl.
*A61M 60/178* (2021.01)
*A61M 60/148* (2021.01)
(Continued)

(52) U.S. Cl.
CPC ........ *A61M 60/178* (2021.01); *A61M 60/148* (2021.01); *A61M 60/216* (2021.01);
(Continued)

(58) Field of Classification Search
CPC .. A61M 60/178; A61M 60/17; A61M 60/165; A61M 60/538; A61M 60/612;
(Continued)

(56) References Cited

U.S. PATENT DOCUMENTS 5,798,454 A 8/1998 Nakazeki et al.
6,030,188 A 2/2000 Nojiri et al.
(Continued)

FOREIGN PATENT DOCUMENTS

CN 1226307 A 8/1999
CN 101041091 A 9/2007
(Continued)

OTHER PUBLICATIONS

The International Search Report issued corresponding PCT application No. PCT/CN2019/115951 dated Jan. 21, 2020.
(Continued)

*Primary Examiner* — Brian A Dukert
(74) *Attorney, Agent, or Firm* — Troutman Pepper Locke LLP

(57) ABSTRACT

A ventricular assist device includes a housing assembly with a pressurized inner chamber, an impeller, an electric motor and a distance sensor. The electric motor includes a controller, a stator and a rotor. The stator and the controller are located in the housing assembly, outside of the pressurized inner chamber and are electrically coupled. The impeller and the rotor are located in the pressurized inner chamber and fixedly coupled. The distance sensor is located in the housing assembly, outside of the pressurized inner chamber and electrically coupled to the controller. The distance sensor senses a distance value of the rotor to a cavity wall of the pressurized inner chamber, and further transmits the distance value to the controller. The controller controls a magnetic force between the stator and the rotor according to the (Continued)

distance value, so as to control a suspension and rotation of the rotor.

14 Claims, 3 Drawing Sheets

(51) Int. Cl.
    *A61M 60/216*     (2021.01)
    *A61M 60/419*     (2021.01)
    *A61M 60/422*     (2021.01)
    *A61M 60/538*     (2021.01)
    *A61M 60/816*     (2021.01)
    *A61M 60/824*     (2021.01)

(52) U.S. Cl.
    CPC ........ *A61M 60/419* (2021.01); *A61M 60/422* (2021.01); *A61M 60/538* (2021.01); *A61M 60/816* (2021.01); *A61M 60/824* (2021.01); *A61M 2205/33* (2013.01)

(58) Field of Classification Search
    CPC . A61M 60/237; A61M 60/242; A61M 60/419
    See application file for complete search history.

(56) References Cited

U.S. PATENT DOCUMENTS

| | | | |
|---|---|---|---|
| 6,302,661 B1* | 10/2001 | Khanwilkar | A61M 60/422 417/423.12 |
| 2001/0016170 A1 | 8/2001 | Ozaki et al. | |
| 2002/0051711 A1 | 5/2002 | Ozaki | |
| 2004/0047737 A1* | 3/2004 | Nose | A61M 60/237 417/44.1 |
| 2004/0143151 A1 | 7/2004 | Mori et al. | |
| 2007/0297923 A1 | 12/2007 | Tada | |
| 2010/0221130 A1 | 9/2010 | Yaegashi et al. | |
| 2012/0089225 A1 | 4/2012 | Akkerman et al. | |
| 2014/0066691 A1* | 3/2014 | Siebenhaar | A61M 60/422 600/16 |
| 2014/0288354 A1* | 9/2014 | Timms | A61M 60/806 600/16 |
| 2016/0235899 A1 | 8/2016 | Yu et al. | |
| 2016/0263300 A1 | 9/2016 | Wiesener et al. | |
| 2017/0021070 A1 | 1/2017 | Petersen | |
| 2017/0122337 A1* | 5/2017 | Itamochi | F04D 29/4273 |
| 2017/0246365 A1 | 8/2017 | Bourque | |

FOREIGN PATENT DOCUMENTS

| | | | | |
|---|---|---|---|---|
| CN | 102239334 A | | 11/2011 | |
| CN | 102247628 A | * | 11/2011 | |
| CN | 205698666 U | | 11/2016 | |
| CN | 107073184 A | | 8/2017 | |
| CN | 108175884 A | | 6/2018 | |
| CN | 210056936 U | | 2/2020 | |
| DE | 4123433 A1 | | 2/1992 | |
| EP | 0378251 A2 | | 7/1990 | |
| EP | 1852060 A1 | | 11/2007 | |
| EP | 3173110 A1 | * | 5/2017 | |
| JP | 104913396 A | | 3/1992 | |
| JP | 2002130177 A | | 5/2002 | |
| JP | 2006167173 A | * | 6/2006 | .......... A61M 60/113 |
| JP | 2010131303 A | | 6/2010 | |
| JP | 2013536021 A | | 9/2013 | |
| JP | 2016188618 A | | 11/2016 | |
| JP | 2017522110 A | | 8/2017 | |
| WO | 2016158186 A1 | | 10/2016 | |

OTHER PUBLICATIONS

The Extended European Search Report issued corresponding EP Application No. EP19897230.9 dated Aug. 30, 2021.
The First Office Action issued corresponding JP Application No. JP2020-537774 dated Aug. 31, 2021.
Notice of Allowance issued on Jun. 13, 2024 in corresponding Chinese Patent Application No. 201811519883.1.

* cited by examiner

VENTRICULAR ASSIST DEVICE

CROSS-REFERENCE TO RELATED APPLICATIONS

This patent application is a U.S. National Phase application under 35 U.S.C. § 371 of International Application No. PCT/CN2019/115951, filed on Nov. 6, 2019, and claims the benefit of Chinese Patent Application No. 201811519883.1, filed on Dec. 12, 2018. The International Application was published in Chinese on Jun. 18, 2020, as WO/2020/119337 A1. Each of these patent applications is incorporated herein by reference in their entirety.

TECHNICAL FIELD

The present disclosure relates to a field of medical devices, in particular to a ventricular assist device with an impeller suspending and rotating.

BACKGROUND

The ventricular assist device (commonly known as "blood pump") is an effective means for treating patients with heart failure. The ventricular assist device is an artificial mechanical device that pumps blood from the venous system or the heart directly into the arterial system, partially or completely replacing the ventricle to work. The ventricular assist device mostly uses impeller rotary pressurization. According to the different support methods of the impeller, it can be divided into contact support and non-contact support. Contact support mainly refers to a support method of mechanical bearings, which causes great damage to blood, and is prone to hemolysis and thrombosis and other phenomena, which brings to a series of complications. Non-contact support includes hydraulic levitation, magnetic levitation, and other method. Compared with contact support, non-contact support has improved blood compatibility.

But non-contact support is more difficult to control. Impeller achieves balance with each other through hydraulic thrust or magnetic force to be suspended in a cavity of ventricular assist device. The motor needs to adjust a rotating speed of the impeller according to a relative distance between the impeller and an inner cavity wall, and then enables the impeller to be suspended and force balance. Normally, the non-contact ventricular assist device will be equipped with a sensor for impeller, which is configured to sense an posture of the impeller, and then adjust a rotation speed of the impeller by controlling the motor. However, the controller of the current non-contact ventricular assist device has a time difference in communication between the sensor and the motor, which causes the controller to bias the movement control of the impeller through the motor, and the control accuracy is low, which is not conducive to the normal work of the rotor.

SUMMARY

Based on this, it is necessary to provide a ventricular assist device capable of achieving high-precision control of the impeller. It includes the following technical solutions:

A ventricular assist device includes a housing assembly, an impeller, an electric motor and a distance sensor. The housing assembly defines a pressurized inner chamber. The impeller is located in the pressurized inner chamber, and is capable of suspending and rotating in the pressurized inner chamber. The electric motor is located in the housing assembly. The electric motor includes a controller, a stator, and a rotor. The controller is located in the housing assembly, and is located outside of the pressurized inner chamber. The stator is electrically coupled to the controller. The stator is located outside of the pressurized inner chamber. The rotor is located in the pressurized inner chamber and fixedly coupled to the impeller. The distance sensor is located in the housing assembly and outside of the pressurized inner chamber. The distance sensor is electrically coupled to the controller. The distance sensor is configured to sense a distance value between the impeller and a cavity wall of the pressurized inner chamber, and further transmit the distance value to the controller. The stator can drive the rotor to suspend and rotate, the impeller can follow the rotor to suspend and rotate. The controller can control a magnetic force between the controller and the rotor according to the distance value, so as to control a rotating speed of the impeller and a distance between the impeller and the cavity wall of the pressurized inner chamber.

The details of one or more embodiments of the present disclosure are set forth in the drawings and description below. Other features, objects, and advantages of the present disclosure will become apparent from the description, drawings, and claims.

BRIEF DESCRIPTION OF THE ACCOMPANYING DRAWINGS

In order to more clearly explain the technical solutions in the embodiments of the present disclosure, the following will briefly introduce the drawings required in the embodiments. Obviously, the drawings in the following description are only some embodiments of the present disclosure. Those of ordinary skill in the art can obtain other drawings based on these drawings without creative efforts.

DETAILED DESCRIPTION OF ILLUSTRATED EMBODIMENTS

The technical solutions in the embodiments of the present disclosure will be described clearly and completely below with reference to the drawings in the embodiments of the present disclosure. Obviously, the described embodiments are only a part of the embodiments of the present disclosure, but not all the embodiments. All other embodiments obtained by a person of ordinary skill in the art based on the embodiments in the present disclosure without creative work fall within the protection scope of the present disclosure.

Figure 1:
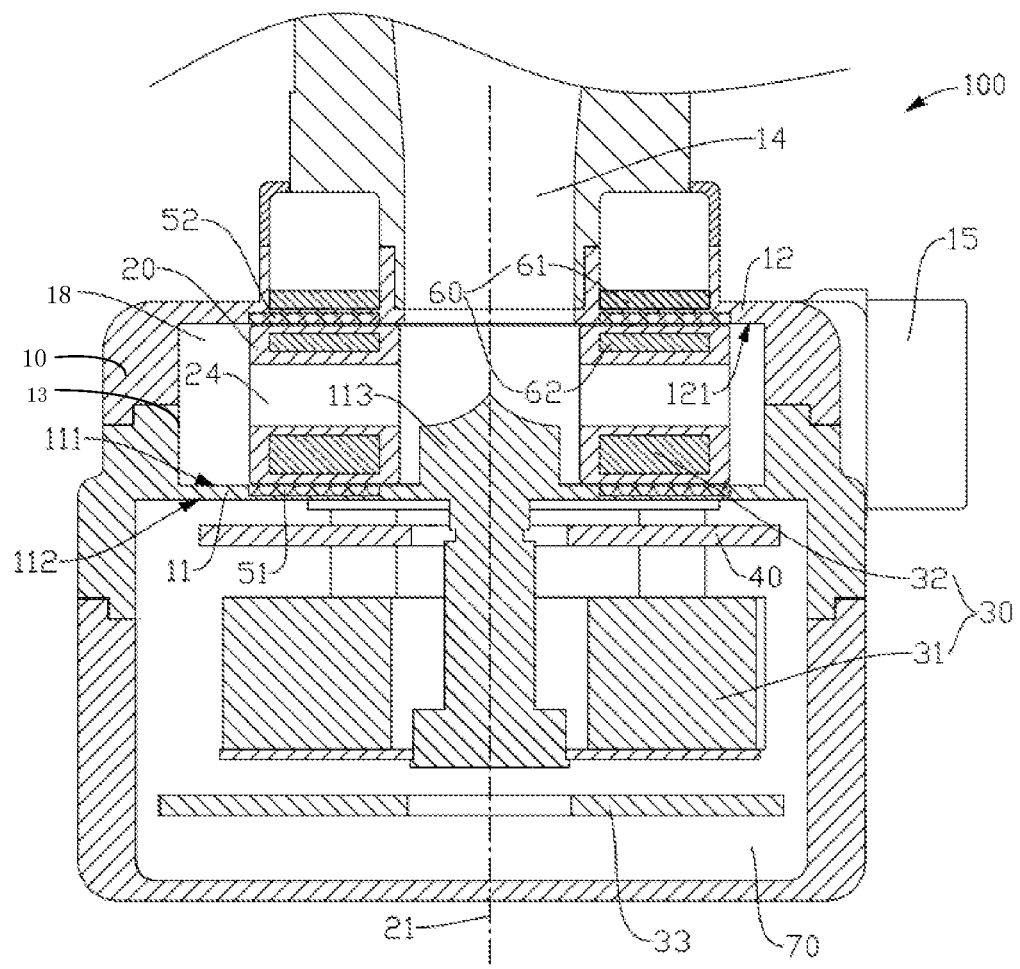
FIG. 1 is a schematic cross-sectional view of a ventricular assist device of embodiment 1.

Please referring to FIG. 1, the ventricular assist device 100 of the embodiment 1 includes a housing assembly 10, an impeller 20, an electric motor 30 and a distance sensor 40.

The housing assembly 10 defines a pressurized inner chamber 18. In at least one embodiment, the pressurized inner chamber 18 has a first sidewall 11 and a second sidewall 12 opposite to the first sidewall 11. Furthermore, in at least one embodiment, the pressurized inner chamber 18 further has a third sidewall 13 coupled between the first sidewall 11 and the second sidewall 12. The first sidewall 11, the second sidewall 12 and the third sidewall 13 cooperatively form the pressurized inner chamber 18.

The impeller 20 is located in the pressurized inner chamber 18, and the impeller 20 can be suspended and rotated in the pressurized inner chamber 18.

The electric motor 30 is located in the housing assembly 10. The electric motor 30 includes a stator 31, a rotor 32, and a controller 33. In at least one embodiment, the stator 31 and the rotor 32 are arranged on two sides of the first sidewall 11, and the stator 31 and the rotor 32 are both disposed close to the first sidewall 11. The stator 31 is located in the housing assembly 10 and outside of the pressurized inner chamber 18. The rotor 32 is located in the pressurized inner chamber 18 and is fixedly coupled to impeller 20. The stator 31 can drive the rotor 32 to suspend and rotate. The impeller 20 can follow the rotor 32 to suspend and rotate. When the stator 31 drives the rotor 32 to suspend and rotate in the pressurized inner chamber 18, the impeller 20 also synchronously suspends and rotates with the rotor 32 in the pressurized inner chamber 18. The rotation action of the impeller 20 can pressurize the blood flowing into the pressurized inner chamber 18, and make the blood flowing out of the pressurized inner chamber 18 have a higher pressure, thereby realizing a blood boosting effect of the ventricular assist device 100. The controller 33 is located in the housing assembly 10 and outside of the pressurized inner chamber 18. The stator 31 and the controller 33 are electrically coupled.

The distance sensor 40 is located in the housing assembly 10 and outside of the pressurized inner chamber 18. The distance sensor 40 is electrically coupled to the controller 33. In at least one embodiment, the distance sensor 40 is located between the stator 31 and the impeller 20. The distance sensor 40 is configured to sense a distance value between the impeller 20 and a cavity wall of the pressurized inner chamber 18, and further transmit the distance value to the controller 33. In at least one embodiment, the distance sensor 40 can sense the distance value of the impeller 20 relative to one side of the first sidewall 11 facing the pressurized inner chamber 18. Specifically, in at least one embodiment, the distance sensor 40 is located between the stator 31 and the first sidewall 11. Specifically, in the embodiment of FIG. 1, the first sidewall 11 and the second sidewall 12 are arranged in parallel with each other, and a rotating axis 21 of the impeller 20 is perpendicular to both the first sidewall 11 and the second sidewall 12 at the same time. The first sidewall 11 has a first surface 111 close to the pressurized inner chamber 18, and a second surface 112 opposite to the first surface 111. The distance sensor 40 is fixedly installed between the stator 31 and the second surface 112, and the distance sensor 40 is configured to sense the distance value of the impeller 20 along the rotating axis 21 relative to the first surface 111. The controller 33 can control the magnetic force between the stator 31 and the rotor 32 according to the distance value transmitted from the distance sensor 40. Specifically, the controller 33 can control an output power of the stator 31 according to the distance value from the distance sensor 40, and then control the magnetic force between the stator 31 and the rotor 32, to control the rotation speed of the impeller 20 and a distance of the impeller 20 relative to the cavity wall of the pressurized inner chamber 18.

The above ventricular assist device 100 realizes blood pressurization through the rotation of the impeller 20 in the pressurized inner chamber 18. The stator 31 of the electric motor 30 is isolated from outside of the pressurized inner chamber 18 through the first sidewall 11, and the rotor 32 is fixed to the impeller 20 at the same time, so that the stator 31 can drive the impeller 20 in the pressurized inner chamber 18 to rotate from the outside of the pressurized inner chamber 18. The distance sensor 40 monitors the distance between impeller 20 and the first sidewall 11 to obtain posture parameters of the impeller 20 in real time. Finally, the magnetic force between the stator 31 and the rotor 32 is controlled by the distance value monitored by the distance sensor 40, so that the stator 31 can drive the rotor 32 to suspend and rotate, so that the impeller 20 is suspended in the pressurized inner chamber 18 and rotates with the rotation of the rotor 32.

The ventricular assist device 100 also includes a positioning magnetic ring group 60, which is located on one side of the second sidewall 12 of the pressurized inner chamber 18. The positioning magnetic ring group 60 includes a positioning magnetic ring 61 and a rotating magnetic ring 62. The positioning magnetic ring 61 is located in the housing assembly 10 and outside of the pressurized inner chamber 18, and is disposed close to or on the second sidewall 12. The positioning magnetic ring 61 is disposed on one side of the second sidewall 12 away from the pressurized inner chamber 18, that is, the positioning magnetic ring 61 is located outside of the second sidewall 12, and is located close to the second sidewall 12. The rotating magnetic ring 62 is fixedly coupled to impeller 20, and the rotating magnetic ring 62 is located in the pressurized inner chamber 18. The controller 33 can control the magnetic force between the stator 31 and the rotor 32 according to the distance value, so that the impeller 20 is suspended in the pressurized inner chamber 18 under an action of the positioning magnetic ring group 60 and the electric motor 30 to rotate.

Specifically, in a direction along the rotating axis 21, the positioning magnetic ring 61 and the rotating magnetic ring 62 mutually generate the magnetic force. This magnetic force and the magnetic force between the stator 31 and the rotor 32 act together on the impeller 20, such that when the two sets of magnetic forces are balanced, the impeller 20 is suspended in pressurized inner chamber 18, thereby achieving a moving state of suspension and rotation. At the same time, in a direction perpendicular to the rotating axis 21, the positioning magnetic ring 61 and the rotating magnetic ring 62 also generate corresponding magnetic forces, the magnetic force causes a thrust force between the impeller 20 and the third sidewall 13 to be generated due to the liquid flow when the impeller 20 is offset in this direction. The thrust force combined with the magnetic force between the positioning magnetic ring group 60 can pull the impeller 20 back to an equilibrium position, that is, the rotating axis 21 is ensured to be not offset during rotation, and maintain an effective working state of the electric motor 30.

The positioning magnetic ring 61 of the positioning magnetic ring group 60 is isolated from outside of the pressurized inner chamber 18 through the second sidewall 12, and the rotating magnetic ring 62 is fixedly coupled to the impeller 20 at the same time, so that the impeller 20 is also subjected to a force of the positioning magnetic ring group 60 in addition to a force of the electric motor 30. The effect of suspension and rotation is achieved by the two forces acting together on the impeller 20. By the distance sensor 40 monitoring the distance between the impeller 20 and the first sidewall 11, an posture parameter of the impeller 20 is obtained in real time. Finally, the distance value monitored by the distance sensor 40 controls the magnetic force between the stator 31 and the rotor 32, so that the force of the electric motor 30 and the positioning magnetic ring group 60 reaches a balanced state, and maintains the posture of suspending and rotating of the impeller 20.

It should be noted that maintaining the suspension balance of the impeller 20 is not limited to the above method. For example, in other embodiments, another motor may be used instead of the positioning magnetic ring group 60.

Furthermore, the impeller 20 suspending and rotating does not contact with the first sidewall 11 or the second sidewall 12 and thus avoids defects such as hemolysis, thrombosis or other phenomena, which can make the ventricular assist device 100 obtain better blood pressure boosting effect. At the same time, the distance sensor 40, the stator 31 and the controller 33 are all disposed in the housing assembly 10. Compared with the traditional implanted ventricular assist device which sets the controller outside of the housing, this setting makes the communication time between distance sensor 40 and the controller 33 shorten, and the electric motor 30 can respond to the rotation speed of the impeller 20 more quickly after receiving the distance value sensed by the distance sensor 40, which improves the control accuracy of the electric motor 30 to the speed of the impeller 20, and further improves the positioning accuracy of the impeller 20.

It should be mentioned that after the impeller 20 reaches a force balance, its suspension posture can be suspended in the pressurized inner chamber 18, or it can reciprocating motion along the rotating axis 21 in the pressurized inner chamber 18. The reciprocating motion of the impeller 20 can play a good role in flushing a secondary flow field of the blood in the pressurized inner chamber 18, making the ventricular assist device 100 have good blood compatibility.

Specifically, the housing assembly 10 also has a seal chamber 70 spaced apart from the pressurized inner chamber 18; the stator 31, the distance sensor 40, and the controller 33 are all located in the seal chamber 70, thereby protecting a normal operation of the distance sensor 40, the stator 31, and the controller 33. Because the ventricular assist device 100 is placed inside a human body, in order to prevent the interference of the stator 31, the distance sensor 40 and the controller 33 to the human body, or the human blood entering the stator 31, the distance sensor 40 and the controller 33 and cause it to work badly, it is necessary to seal and protect the stator 31, the distance sensor 40 and the controller 33 and other devices. The seal chamber 70 is located on the other side of the first sidewall 11 relative to the pressurized inner chamber 18, that is, the seal chamber 70 and the pressurized inner chamber 18 are disposed adjacent to each other.

On the other hand, the controller 33 can be a module independent of the stator 31, or it can be built into the stator 31. In the embodiment of FIG. 1, the controller 33 is a module independent of the stator 31, and the controller 33 is electrically coupled to the distance sensor 40 and the stator 31, respectively. The controller 33 is configured to control the output power of the stator 31 after receiving the distance value sensed by the distance sensor 40, and then control the power of the stator 31, that is, control the magnetic force between the stator 31 and the rotor 32. Because the rotor 32 is fixedly coupled to the impeller 20, the magnetic control of the rotor 32 by the stator 31 can also achieve a speed control effect of the rotor 31 by the impeller 20. When the controller 33 is an independent module, the controller 33 should be fixed on one side of the stator 31 away from the distance sensor 40. That is, the controller 33 and the distance sensor 40 are arranged on two sides of the stator 31 along the direction of the rotating axis 21. Because of the cooperation between the stator 31 and the rotor 32, after the distance sensor 40 and the first sidewall 11 have been disposed therebetween, if the controller 33 is also disposed between the stator 31 and the rotor 32, it may cause excessive interference to the force between the stator 31 and the rotor 32. Therefore, the controller 33 is disposed on one side of the stator 31 away from the distance sensor 40, which can reduce a working influence of the controller 33 on the stator 31 and the rotor 32, and ensure the controller 33 and the distance sensor 40 communicate in a relatively short range at the same time.

As the above ventricular assist device 100 has the built-in electric motor 30, and the distance sensor 40 and the electric motor 30 realize data exchange inside the ventricular assist device 100, which shortens the time difference between the distance sensor 40 monitors the distance value of the impeller 20 and the magnetic adjustment of the stator 31 and the rotor 32, making the electric motor 30 provide more precise magnetic control to the impeller 20, which improves a response speed of the ventricular assist device 100, thus ensuring that the blood will not be damaged by the suspension of the impeller 20 and obtain better blood boosting effect.

On the other hand, the distance sensor 40, the stator 31, and controller 33 are arranged in the direction of the rotating axis 21 of the impeller 20, which can reduce a radial dimension of the ventricular assist device 100. A radial dimension of ventricular assist device 100 is usually larger than an axial dimension of ventricular assist device 100, after the radial dimension of the ventricular assist device 100 is controlled, the wound of the patient is smaller when it is implanted into the human body, which can better protect the patient. Specifically, the distance sensor 40 and the controller 33 are electrically coupled through a flexible data line, the flexible data line can be bent according to a shape of the stator 31, which occupies less internal space and is beneficial to a control of an overall volume of the ventricular assist device 100.

The distance sensor 40 can use a Hall plate, which is provided with multiple Hall chips. The Hall chip can be configured to sense the distance value of the impeller 20 relative to the first sidewall 11 and transmit the distance value to the controller 33 through the flexible data line.

The above ventricular assist device 100 is configured for blood pressure boosting, and its pressurization position is disposed in the pressurized inner chamber 18. Therefore, the above ventricular assist device 100 also defines an inlet 14 and an outlet 15 interconnected with the pressurized inner chamber 18 respectively. The inlet 14 is used for the blood flowing into the pressurized inner chamber 18, and the outlet 15 is used for the blood flowing out from the pressurized inner chamber 18 after being pressurized. It can be seen in the embodiment of FIG. 1, the inlet 14 should be set at a position of the second sidewall 12. At the same time, in order to ensure an orderly operation of the positioning magnetic ring group 60, it is advisable to arrange the positioning magnetic ring 61 outside of the inlet 14 and along the inlet 14. When the blood flows into the pressurized inner chamber 18, it faces the rotating axis 21 of the impeller 20, so that the blood spreads more evenly in the pressurized inner chamber 18, and the ventricular assist device 100 uniformly pressurizes the blood. When the blood enters the pressurized inner chamber 18 along the rotating axis 21, it will not cause too much pressure interference to the suspended rotation state of the impeller 20.

Figure 2:
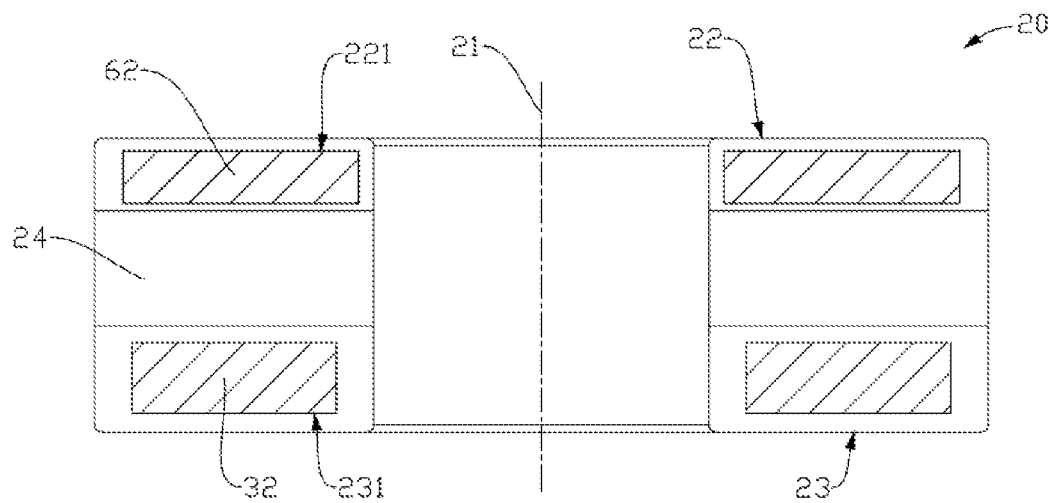
FIG. 2 is a schematic cross-sectional view of an impeller of the ventricular assist device shown in FIG. 1.

In the embodiment shown in FIG. 2, the impeller 20 has a ring shape, and the inlet 14 is facing the inner ring of the ring-shaped impeller 20 directly. The impeller 20 has a third surface 22 and a fourth surface 23 opposite to the third surface 22, and a flow channel 24. The flow channel 24 extends radially along the annular impeller 20, and the flow channel 24 is disposed between the third surface 22 and the fourth surface 23. The flow channel 24 interconnects with the inner ring of the impeller 20. In the radial direction of the impeller 20, the flow channel 24 extends from the inner wall of the impeller 20 to the outer wall of the impeller 20. The opening of the flow channel 24 on the outer wall of the impeller 20 can be opposite to the outlet 15. After the blood enters the inner ring of the impeller 20, it flows out of impeller 20 from the flow channel 24. With the rotation of the impeller 20 in the flow channel 24, the flow rate of the blood increases, thereby obtaining the effect of pressurization, and then flows out of the outlet 15. Correspondingly, the first sidewall 11 also extends a drainage cone 113 toward the inner ring of the impeller 20. The drainage cone 113 is configured to drain the blood flowing into the inner ring of the impeller 20 into the flow channel 24. The third surface 22 of the impeller 20 faces the second sidewall 12. The impeller 20 defines a first receiving groove 221 and a second receiving groove 231. The first receiving groove 221 is disposed close to the third surface 22. The second receiving groove 231 is disposed close to the fourth surface 23. The first receiving groove 221 is configured to accommodate the rotating magnetic ring 62. The second receiving groove 231 is configured to accommodate the rotor 32. The rotating magnetic ring 62 and the rotor 32 are accommodated in the impeller 20, which makes the third surface 22 and the fourth surface 23 both have flat shapes. The blood flows between the third surface 22 and the second sidewall 12, and between the fourth surface 23 and the first sidewall 11 more smoothly, preventing blood from being blocked and thus formed defect such as hemolysis, thrombosis and the like in the pressurized inner chamber 18.

It should be mentioned that the openings of the first receiving groove 221 and the second receiving groove 231 can be defined on the third surface 22 and the fourth surface 23 respectively. The first receiving groove 221 and the second receiving groove 231 can also be defined inside of the impeller 20 respectively, as shown in FIG. 2, that is, the first receiving groove 221 is a closed space close to the third surface 22 inside the impeller 20, the second receiving groove 231 is a closed space close to fourth surface 23 inside the impeller 20. Such a configuration helps to improve a surface consistency of the third surface 22 and the fourth surface 23 of the impeller 20, thereby making a turning action of the impeller 20 in the pressurized inner chamber 18 more stable. In present disclosure, the television (or the display) can be tilted upwards, downwards, rotated left or right, and raised or lowered height by the mutual cooperation of the mounting member, the adjustment base, the fixed base, the connecting standpipe, the connecting horizontal pipe, the supporting standpipe, and the adjusting pipe, so that it can be flexibly adjusted according to actual observation needs of users, which improves its adaptability, and can be widely used in pickup trucks, motor homes, SUV, vehicles and other types of cars. At the same time, the television is mounted in a quick-mounted structure, which is more convenient to operate.

In at least one embodiment, the first surface 111 has a the first hydrodynamic bearing 51 disposed therein. When the impeller 20 rotates, the first hydrodynamic bearing 51 will provide the impeller 20 with a thrust force along the rotating axis 21 and away from the first surface 111 due to the flow of blood. The thrust force increases exponentially when the impeller 20 approaches the first surface 111, so the impeller 20 can be pushed away from the first surface 111, to avoid direct contact between the impeller 20 and the first sidewall 11, and to ensure the impeller 20 to be suspended in the pressurized inner chamber 18 and rotate. It can be understood that the first hydrodynamic bearing 51, the electric motor 30 and the positioning magnetic ring group 60 cooperatively control the work of the impeller 20 to ensure the posture of suspending and rotating of the impeller 20 in the pressurized inner chamber 18. What needs to be mentioned is that the thrust force generated by the first hydrodynamic bearing 51 on the impeller 20 has a certain correlation with a rotating speed of the impeller 20. When the impeller 20 rotates at a faster speed, the blood between the impeller 20 and the first surface 111 will flow at a faster speed, and thus the blood will generate a greater thrust force to the impeller 20 under the action of the first hydrodynamic bearing 51, the suspension balance of the impeller 20 is broken because of this greater thrust force, and then pushed away from the first surface 111 by the first hydrodynamic bearing 51. At this time, the distance sensor 40 senses a change of the distance value of the impeller 20 relative to first surface 111, and transmits the changed distance value to the controller 33, the controller 33 can increase a power of the stator 31 according to the changed distance value, thereby increasing the magnetic force between the stator 31 and the rotor 32. When the rotor 32 is pulled by a greater magnetic force, the impeller 20 is driven back toward the first sidewall 11, that is, toward the first surface 111. Conversely, when the rotating speed of the impeller 20 is slow, the thrust force of the first hydrodynamic bearing 51 on the impeller 20 decreases, and the impeller 20 also moves closer to the first surface 111. The distance sensor 40 senses that the distance value of the impeller 20 relative to the first surface 111 becomes smaller, and the controller 33 reduces the power of the stator 31 after receiving the reduced distance value, thereby reducing the magnetic force between the stator 31 and the rotor 32, so that the impeller 20 is pushed away from the first surface 111. As a result, the impeller 20 is pushed away or closer to the first surface 111 repeatedly, and the force of the impeller 20 is balanced by a cooperation of the positioning magnetic ring group 60, the first hydrodynamic bearing 51 and the electric motor 30, making the impeller 20 suspended in pressurized inner chamber 18 along the direction of the rotating axis 21.

In at least one embodiment, one side of the second sidewall 12 close to the pressurized inner chamber 18 is a fifth surface 121. There is a second hydrodynamic bearing 52 at the fifth surface 121. The second hydrodynamic bearing 52 is the same as the first hydrodynamic bearing 51, and generates a thrust force for pushing the impeller 20 away from the second sidewall 12. The second hydrodynamic bearing 52 cooperates with the positioning magnetic ring group 60, the first hydrodynamic bearing 51, and the electric motor 30 in a direction along the rotating axis 21, so that the impeller 20 is suspended and rotated in the pressurized inner chamber 18. The force between the impeller 20 and the first hydrodynamic bearing 51 or between the impeller 20 and the second hydrodynamic bearing 52 changes exponentially with the distance between the impeller 20 and the first surface 111 or between the impeller 20 and the fifth surface 121. That is, the closer the distance between the impeller 20 and the first surface 111, the greater the rate of the increase in the thrust force of the first hydrodynamic bearing 51 to the impeller 20. Conversely, the closer the distance between the impeller 20 and the fifth surface 121, the greater the rate of the increase in the thrust force of the second hydrodynamic bearing 52 to the impeller 20. Therefore, due to the thrust force of the first hydrodynamic bearing 51 and the second hydrodynamic bearing 52, in the direction of the rotating axis 21, the impeller 20 is difficult to directly contact with the first sidewall 11 or the second sidewall 12, and can be suspended in the pressurized inner chamber 18 and rotate more stably.

Figure 3:
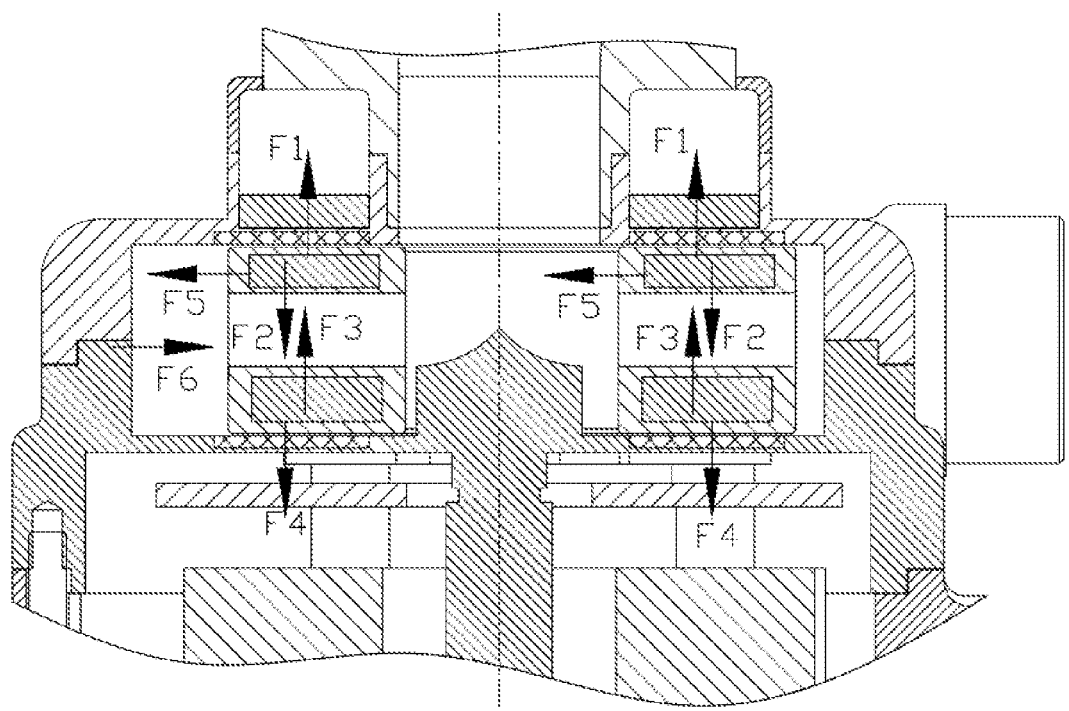
FIG. 3 is a force diagram of the impeller of the ventricular assist device shown in embodiment 1.

FIG. 3 shows a force diagram of the impeller 20. Because the overall gravity of the impeller 20 is relatively small, the gravity factor of the impeller 20 is excluded for analysis: in the direction along the rotating axis 21, the impeller 20 is subjected to the magnetic force F4 of the stator 31 to the rotor 32, the thrust force F3 of the first hydrodynamic bearing 51, the thrust force F2 of the second hydrodynamic bearing 52, and the magnetic force F1 of the positioning magnetic ring 61 to the rotating magnetic ring 62. The impeller 20 needs to satisfy a condition of F1+F2+F3+F4=0 in the direction of the rotating axis 21 in order to be suspended in pressurized inner chamber 18 and rotate stably. The magnetic force F4 generated by the electric motor 30 is an active power of the ventricular assist device 100. The adjustment of F4 by the controller 33 can maintain a suspension stability of the impeller 20 in the direction of the rotating axis 21. It should be noted that, since the direction of the thrust force F3 of the first hydrodynamic bearing 51 and the thrust force F2 of the second hydrodynamic bearing 52 are unique, the direction of the magnetic force between the positioning magnetic ring group 60 needs to be opposite to the direction of the magnetic force of the electric motor 30 to effectively control the suspension posture of the impeller 20. Generally, in the electric motor 30, the magnetic force between the stator 31 and the rotor 32 is a magnetic attraction force, so the magnetic force between the positioning magnetic ring 61 and the rotating magnetic ring 62 also needs to be expressed as a magnetic attraction force. Of course, in some embodiments, if the magnetic force between the stator 31 and the rotor 32 is a magnetic thrust force, the magnetic force between the positioning magnetic ring 61 and the rotating magnetic ring 62 also needs to be set as the magnetic thrust force. The ventricular assist device 100 of the present disclosure does not specifically limit specific directions of F1 and F4.

The inner surface of the third sidewall 13 is parallel to the rotating axis of the impeller 20, such that in the direction perpendicular to the rotating axis 21, the impeller 20 receives the magnetic force F5 from the positioning magnetic ring 61 to the rotating magnetic ring 62, and the thrust force F6 from the third sidewall 13 to the impeller 20, respectively. The impeller 20 needs to meet the condition of F5+F6=0 in the direction perpendicular to the rotating axis 21 in order to be suspended in the pressurized inner chamber 18 and rotate stably. Because the inner surface of the third sidewall 13 can generate a thrust force toward the rotating axis 21 to the impeller 20 in any direction, the magnetic force between the positioning magnetic ring 61 and the rotating magnetic ring 62 can be expressed as a magnetic attraction force or a magnetic thrust force, which can satisfy a force balance of the impeller 20 in the vertical direction of the rotating axis 21 in the pressurized inner chamber 18.

Figure 4:
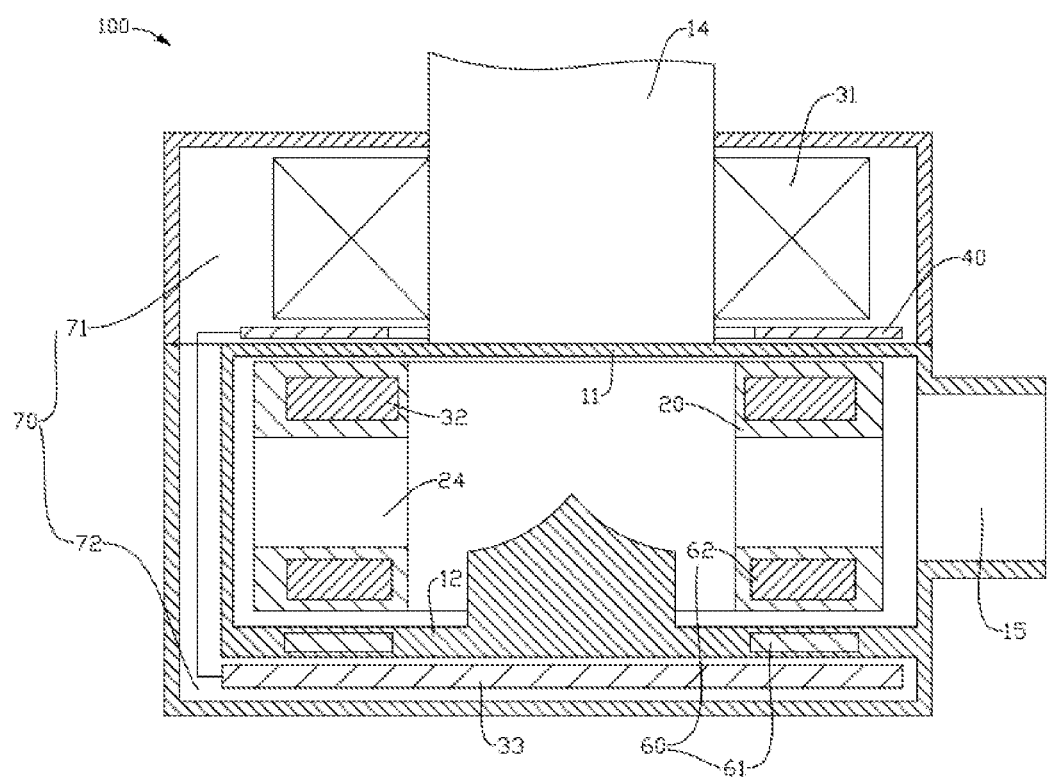
FIG. 4 is a schematic cross-sectional view of the ventricular assist device of embodiment 2.

Please referring to embodiment 2 of FIG. 4, in the illustrated embodiment, the inlet 14 is located at the first sidewall 11, and the stator 31 and the distance sensor 40 are located close to the inlet 14 and are located outside of the inlet 14. Correspondingly, the positioning magnetic ring group 60 is set at the second sidewall 12. In this embodiment, the impeller 20 is located between the controller 33 and the distance sensor 40, that is, the pressurized inner chamber 18 is located between the controller 33 and the distance sensor 40. The housing assembly 10 also has a seal chamber 70 spaced apart from the pressurized inner chamber 18, because the seal chamber 70 needs to seal the stator 31 and the distance sensor 40, and also needs to seal the controller 33. Therefore, in the embodiment of FIG. 4, the seal chamber 70 includes a first sealing portion 71 and a second sealing portion 72. The first sealing portion 71 and the second sealing portion 72 are arranged on both sides of the pressurized inner chamber 18 along the direction of the rotating axis 21, the controller 33 is accommodated in the second sealing portion 72, and the stator 31 and the distance sensor 40 are accommodated in the first sealing portion 71. A through hole is defined between the first sealing portion 71 and the second sealing portion 72 to allow the flexible data line to pass through, so as to realize an electrical connection between the controller 33 and the distance sensor 40 and an electrical connection between the controller and the stator 31, respectively. In this embodiment, the impeller 20 also achieves suspension balance through a cooperation of the electric motor 30 and the positioning magnetic ring group 60 in a direction perpendicular to the rotating axis 21. At the same time, in this embodiment, a first hydrodynamic bearing 51 and/or a second hydrodynamic bearing 52 may also be provided to assist the suspension action of the impeller 20, which also belongs to the technical solution claimed in the present disclosure.

The above-mentioned embodiments do not constitute a limitation on the protection scope of the technical solution. Any modifications, equivalent replacements and improvements made within the spirit and principles of the above-mentioned embodiments should be included in the protection scope of the technical solution.

What is claimed is:

1. A ventricular assist device, comprising a housing assembly, an impeller, an electric motor, and a distance sensor;

wherein the housing assembly defines a pressurized inner chamber, the impeller is located in the pressurized inner chamber, and is capable of suspending and rotating in the pressurized inner chamber;

wherein the electric motor is located in the housing assembly; the electric motor comprises a controller, a stator, and a rotor; the controller is located in the housing assembly, and is located outside of the pressurized inner chamber; the stator is electrically coupled to the controller, the stator is located outside of the pressurized inner chamber; the rotor is located in the pressurized inner chamber and fixedly coupled to the impeller;

wherein the distance sensor is located in the housing assembly, between the stator and the impeller, and is located outside of the pressurized inner chamber; the distance sensor is electrically coupled to the controller; the controller is a module independent of the stator, and the controller is fixed on one side of the stator away from the distance sensor; in a direction of a rotating axis of the impeller, the stator is located between the distance sensor and the controller; and wherein the distance sensor is configured to sense a distance value between the impeller and a cavity wall of the pressurized inner chamber, and can transmit the distance value to the controller; the stator can drive the rotor to suspend and rotate; the impeller can follow the rotor to suspend and rotate; the controller can control a magnetic force between the stator and the rotor according to the distance value, so as to control a rotating speed of the impeller, and a distance of the impeller relative to the cavity wall of the pressurized inner chamber.

2. The ventricular assist device according to claim 1, wherein the controller and the distance sensor are electrically coupled by a flexible data line.

3. The ventricular assist device according to claim 1, wherein the housing assembly further has a seal chamber spaced apart from the pressurized inner chamber; the stator, the distance sensor, and the controller are all located at the seal chamber.

4. The ventricular assist device according to claim 1, wherein the pressurized inner chamber has a first sidewall and a second sidewall opposite to the first sidewall; the stator and the rotor are both disposed close to the first sidewall; the ventricular assist device further comprises a positioning magnetic ring group; the positioning magnetic ring group comprises a positioning magnetic ring and a rotating magnetic ring; the positioning magnetic ring is located in the housing assembly and outside of the pressurized inner chamber, and is located close to the second sidewall or located on the second sidewall; the rotating magnetic ring is located in the pressurized inner chamber, and is located close to the second sidewall; the rotating magnetic ring is fixedly coupled to the impeller; the controller controls a magnetic force between the stator and the rotor according to the distance value, so that the impeller is suspended and rotated in the pressurized inner chamber under an action of the positioning magnetic ring group and the electric motor.

5. The ventricular assist device according to claim 4, wherein one side of the first sidewall close to the pressurized inner chamber is provided with a first hydrodynamic bearing; the positioning magnetic ring group, the first hydrodynamic bearing, and the electric motor works together to make the impeller suspended in the pressurized inner chamber and rotate.

6. The ventricular assist device according to claim 5, wherein one side of the second sidewall close to the pressurized inner chamber is provided with a second hydrodynamic bearing; the second hydrodynamic bearing, the positioning magnetic ring group, the first hydrodynamic bearing and the electric motor work together to make the impeller suspended in the pressurized inner chamber and rotate.

7. The ventricular assist device according to claim 4, wherein the pressurized inner chamber further has a third sidewall coupled between the first sidewall and the second sidewall; the third sidewall, the first sidewall and the second sidewall cooperatively form the pressurized inner chamber, and an inner surface of the third sidewall is parallel to a rotating axis of the impeller.

8. The ventricular assist device according to claim 4, wherein the impeller has a ring shape, and the ventricular assist device further has an inlet interconnected with the pressurized inner chamber; the inlet is located on the second sidewall; a position of the inlet is opposite to a position of an inner ring of the impeller.

9. The ventricular assist device according to claim 8, wherein the ventricular assist device further has an outlet interconnected with the pressurized inner chamber; the impeller defines a flow channel; the flow channel interconnects with the inner ring of the impeller; the flow channel extends from an inner wall of the impeller to an outer wall of the impeller in a radial direction of the impeller; an opening of the flow channel on the outer wall of the impeller faces with the outlet.

10. The ventricular assist device according to claim 9, wherein the inlet is located on the second sidewall, and the pressurized inner chamber is further provided with a drainage cone extending from the first sidewall toward the inner ring of the impeller; the drainage cone is configured to drain blood flowing into the inner ring of the impeller into the flow channel.

11. The ventricular assist device according to claim 9, wherein the impeller further defines a first receiving groove and a second receiving groove; the first receiving groove and the second receiving groove are configured to receive the rotating magnetic ring and the rotor respectively; the first receiving groove, the flow channel, and the second receiving groove are disposed in this order in the direction of the rotating axis of the impeller.

12. The ventricular assist device according to claim 4, wherein the impeller further defines a first receiving groove and a second receiving groove; the first receiving groove and the second receiving groove are respectively configured to receive the rotating magnetic ring and the rotor.

13. The ventricular assist device according to claim 11, wherein the first receiving groove and the second receiving groove are both sealed grooves.

14. The ventricular assist device according to claim 4, wherein the distance sensor is capable of sensing the distance value of the impeller relative to one side of the first sidewall facing the pressurized inner chamber.

* * * * *